United States Patent [19]

Hartford, Jr. et al.

[11] 4,202,741
[45] May 13, 1980

[54] ENRICHMENT OF NITROGEN ISOTOPES BY INDUCED ISOMERIZATION OF ISOCYANIDES

[75] Inventors: Allen Hartford, Jr., Denville; Sam A. Tuccio, Randolph, both of N.J.

[73] Assignee: Allied Chemical Corporation, Morris Township, Morris County, N.J.

[21] Appl. No.: 893,099

[22] Filed: Apr. 3, 1978

[51] Int. Cl.$^2$ .......................... B01D 59/00; B01J 1/12
[52] U.S. Cl. .................... 204/158 R; 204/DIG. 11
[58] Field of Search ............... 204/158 R, DIG. 11; 250/423 P

[56] References Cited

U.S. PATENT DOCUMENTS

| | | | |
|---|---|---|---|
| 3,405,045 | 10/1968 | Hoskins | 204/DIG. 11 |
| 3,719,454 | 3/1973 | Shang | 204/158 R X |
| 3,941,670 | 3/1976 | Pratt | 204/158 R |
| 3,947,335 | 3/1976 | Marling | 204/158 R |
| 3,983,020 | 9/1976 | Moore et al. | 204/158 R |
| 4,029,558 | 6/1977 | Marling | 204/158 R |
| 4,029,559 | 6/1977 | Marling | 204/158 R |
| 4,064,025 | 12/1977 | Chen | 204/158 R |
| 4,105,921 | 8/1978 | Bartlett et al. | 250/423 P |
| 4,120,767 | 10/1978 | Bittenson et al. | 204/158 R |

FOREIGN PATENT DOCUMENTS 690681 7/1974 Canada .
2557206 3/1977 Fed. Rep. of Germany ....... 250/423 P

OTHER PUBLICATIONS

Moore, C. B., "The Application of Lasers to Isotope Separation", *Accts. of Chem. Res.,* 6:323-328, 1973.
Ambartzumian, R. V. et al., "Selective Two-Step (STS) Photoionization of Atoms and Photodissociation of Molecules by Laser Radiation", *App. Opt.* 11(2):354-358, 1972.
Marling, J. B., "Laser Isotope Separation of Deuterium", *Chem. Phys. Lett.,* 34(1):84-89, 1975.
Lin, C. T., "Laser Stark Spectroscopy and Isotopic Separation", *Spectro. Lett.,* 9(9):615-631, 1976.

*Primary Examiner*—Richard E. Schafer
*Attorney, Agent, or Firm*—Ernest D. Buff; Gerhard H. Fuchs

[57] ABSTRACT

The essentially monochromatic infrared radiation from a laser device with a frequency coincident with a vibrational absorption band of an isocyanide, for example, methyl isocyanide ($CH_3NC$), leads to isomerization to the corresponding nitrile, in this example, acetonitrile ($CH_3CN$). This isomerization is accomplished isotopically selectively for vibrational bands which exhibit an isotope shift. As a consequence, the enrichment and separation of nitrogen or carbon isotopes may be accomplished.

10 Claims, 4 Drawing Figures

ENRICHMENT OF NITROGEN ISOTOPES BY INDUCED ISOMERIZATION OF ISOCYANIDES

BACKGROUND OF THE INVENTION

1. Field of the Invention

The present invention relates to enrichment and separation of isotopes, in particular $^{14}N$ and $^{15}N$, and $^{12}C$ and $^{13}C$ by infrared radiation induced isomerization of isocyanides.

2. Description of the Prior Art

The projected use of $^{15}N$ in the nuclear industry is expected to reach 300,000 kg/year. Use is in liquid-metal fast breeder reactors. Also, $^{15}N$ and $^{13}C$ are presently used as tracers in the fields of medicine and research. Low cost schemes for separating these isotopes are accordingly required.

Ambartsumyan et al. in Vol. 17, *Journal of Experimental and Theoretical Physics Letters*, pp. 63–65 (1973) disclose isotope separation of $^{14}N$ and $^{15}N$ by a two-step photodissociation of $^{14}NH_3$ and $^{15}NH_3$, in which monochromatic radiation of a frequency $\nu_1$ selectively excites a vibrational transition of molecules of only one isotopic composition. The molecules are simultaneously illuminated with light of frequency $\nu_2$, the quantum energy of which is sufficient for photodissociation of only the vibrationally excited molecules. However, this is a costly process and provides a possibility of isotopic scrambling due to four different intermediate chemical reactions.

Brauman et al. in *Optics Communications*, Vol. 12, No. 2, pp. 223–224 (1974) propose isotope separation by selective unimolecular photoisomerization. The proposed procedure comprises placing isomer A, having a mixed isotopic composition, in a reaction chamber, where it is excited in an isotopically selective manner. Some of the excited A is deactivated back to the ground state, while the rest is converted to isomer B, which is now enriched in the isotope of interest. The mixture is then removed from the reaction vessel and the isomers are separated by conventional means, such as by distillation or by chromatography. The desired isotope can then be removed from isomer B by carefully designed physical or chemical methods. The authors suggest possible reactions, which include cis, trans isomerizations (e.g., dihaloethylenes) via singlets or triplets, valence bond isomerizations (e.g., dienes to cyclobutanes) and others (e.g., isocyanides to cyanides). However, other than suggesting the foregoing general reaction schemes, there are no details as to proposed reaction mechanisms, laser wavelengths that must be employed or other experimental details.

Robinson et al. in U.S. Pat. No. 4,049,515, issued Sept. 20, 1977, disclose laser isotope separation schemes by multiple photon absorption. Briefly, the schemes involve irradiating a molecular species having at least two isotopes of an element with infrared laser light of a frequency which selectively excites to a vibrational level only those molecules of the molecular species containing a particular isotope. Use of multiple photon absorption produces a sufficiently energetic vibrational state such that the molecules containing the particular isotope undergo a chemical reaction, such as dissociation or reaction with a second molecular species. The patent discloses two examples for which laser induced enrichment was obtained; namely the enrichment of $^{34}S$ in natural $SF_6$ and $^{11}B$ in natural $BCl_3$. However, there is no teaching therein of a method for selecting a candidate molecular species from the essentially infinite number of species which exist for any given element for which the process of Robinson et al. is applicable. When a molecule is subjected to infrared radiation in the manner taught by Robinson et al., the isotopic shift is generally masked by other vibrational modes or, if unmasked, has a magnitude lower than that required for isotope separation. In addition, it has not been possible to precisely predict the manner in which a molecule will dissociate or react with other species when subjected to high intensity infrared radiation. Hence no general method can be given for devising a laser-chemical reaction system which will effect removal of the desired isotopic species. As a result, it has heretofore not been possible to predict which molecules lend themselves to laser isotope separation by multiple photon absorption.

Although present usage of $^{15}N$ is small, projected use in core elements of liquid-metal fast breeder reactors is considerable, as mentioned above. Current separation of $^{15}N$ is accomplished by NO distillation, or by chemical exchange between NO and $HNO_3$. The latter process has an enrichment factor of about 1.055. The only proposed separation of nitrogen isotopes with a laser discussed above (Ambartsumyan et al.) suggests an isotopic enrichment factor of about 4. However, the considerable potential for isotopic scrambling renders the proposed process unsuitable on a commercial scale.

Carbon isotopes are presently separated by low temperature distillation of carbon monoxide and by gas phase thermal diffusion of methane. The carbon monoxide process for separating $^{13}C$ is based on a vapor pressure differential that yields an enrichment factor of about 1.011.

SUMMARY OF THE INVENTION

In accordance with the invention, a process is disclosed for obtaining nitrile compounds which are enriched in a particular first elemental isotope. The process comprises exposing a gaseous organic isocyanide containing said first isotope and one or more isotopes of the same element to infrared radiation of a predetermined wavelength from a laser-based device which selectively isomerizes said isocyanide containing said first isotope to the corresponding nitrile without substantially isomerizing said isocyanide containing other isotopes of the same element.

Specifically, a process is provided for enrichment of nitrogen isotopes which comprises exposing an organic isocyanide to substantially monochromatic infrared laser radiation. The radiation is either obtained directly from an infrared laser or from laser-based sources such as frequency harmonic generators, difference frequency generators or stimulated Raman scattering. The frequency of the infrared radiation is coincident with a vibration absorption band of an isocyanide e.g., methyl isocyanide ($CH_3NC$), leading to isomerization to the corresponding nitrile, e.g., acetonitrile ($CH_3CN$). This isomerization is accomplished isotopically selectively by employing a vibrational band which exhibits an isotope shift. Enrichment factors of about 1.3 have been achieved. Factors greater than 50 are feasible with prescribed changes in excitation wavelength.

The process provided herein may be directly applied to the enrichment of carbon isotopes by slightly modifying the wavelength of the laser radiation employed.

DETAILED DESCRIPTION OF THE INVENTION

Figure 1:
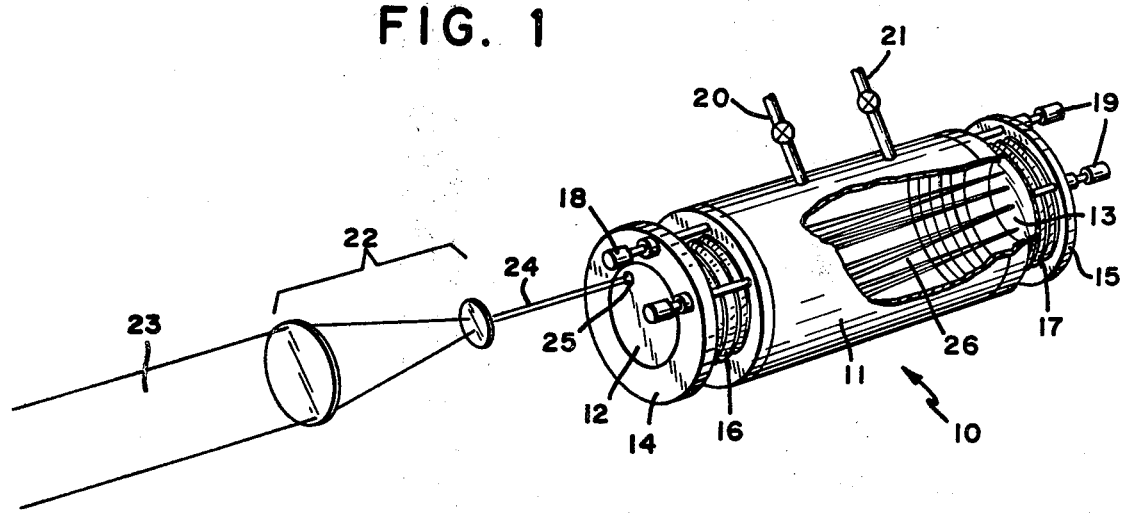
FIG. 1 is a perspective view, partially cut-away, depicting apparatus useful in the practice of the invention.

In the inventive process, a vibration frequency in the isocyanide of interest is determined which is conveniently coincident with the output of a light source, such as a laser, operating in the infrared region. For the $^{15}N$ containing species, a sizeable isotope shift toward lower frequency relative to the $^{14}N$ material is expected, depending on the particular vibrational mode. This shift is a consequence of the difference in reduced masses. In addition to this consideration, the thermal activation energy for isomerization is sufficiently low so that the adsorption of multiple infrared protons from the output of the laser can induce the desired isomerization. Further, since the vibrational isotope shift is sufficiently large, selective excitation and, consequently, selective isomerization are possible. For example, $CH_3^{15}NC$ may be substantially converted to $CH_3C^{15}N$, while the $CH_3^{14}NC$ is unaffected. The $CH_3C^{15}N$ may then be removed from the unconverted methyl isocyanide by conventional physical methods.

Any of the organic isocyanides having vibrational frequencies exhibiting an isotope shift and which are coincident with the output of a source of infrared radiation are suitable in the practice of the invention. Such organic isocyanides should be gaseous under the operating conditions in order to provide a capability for adjusting the molecular density. More preferred are alkyl isocyanides, which are convenient low cost sources. Most preferred is a lower order alkyl isocyanide, such as (a) methyl isocynaide, which has a C—$^{14}N$ stretching frequency centered at 945 cm$^{-1}$ and a $^{14}N\equiv C$ stretching frequency centered at 2166 cm$^{-1}$ or (b) ethyl isocyanide, which has analogous stretching frequencies centered at 1021 cm$^{-1}$ and 2151 cm$^{-1}$, respectively. Further, the thermal activation energy for isomerization of $CH_3NC$ or $C_2H_5NC$ to the corresponding nitrile is only about 35 Kcal/mole, which is overcome by absorption of multiple photons from an infrared laser-based source.

The radiation employed is substantially monochromatic, by which is meant that the bandwidth of the radiation is less than the isotope shift. For example, the C—N stretching frequency of $CH_3NC$ at 945 cm$^{-1}$ has an isotope shift of about 4.5 cm$^{-1}$, while the N$\equiv$C stretching mode (2166 cm$^{-1}$) has an isotope shift of about 38 cm$^{-1}$. In $C_2H_5NC$, the C—C—N asymmetric stretching frequency at 1021 cm$^{-1}$ has an isotope shift of about 3 cm$^{-1}$, while the N C stretching mode at 2151 cm$^{-1}$ has an isotope shift of 41 cm$^{-1}$.

Radiation sources which meet the criteria of narrow bandwidth and high power are typically laser-based devices. The output of a $CO_2$ laser, which is tunable in the approximate range of 900 to 1100 cm$^{-1}$, is conveniently used directly to excite the C—N stretch and C—C—N asymmetric stretch vibrational bands. The N$\equiv$C stretching frequency is directly accessed by a $D^{35}Cl$ chemical laser or an $H^{81}Br$ chemical laser. In addition to the use of these two chemical lasers, there are several laser-based systems for exciting the N$\equiv$C vibrational band. These systems operate by frequency shifting the output of one or more lasers through nonlinear phenomena, such as second-harmonic generation, difference frequency generation, and stimulated Raman scattering. The following examples are noted mainly because of their high power output capability:

(1) Second-harmonic generation of the output of a $CO_2$ laser using crystals of $CdGeAs_2$ or $CdTe$.

(2) Difference frequency generation by mixing the outputs of a Nd-doped LHG-5 phosphate glass laser (output wavelength of 1.056$\mu$m) and a Nd:YAG laser (output wavelength of 1.357$\mu$m) in $LiIO_3$ or $Ag_3AsS_3$.

(3) Difference frequency generation by mixing the outputs of a $YLiF_4:Nd^{3+}$ laser ($\lambda=1.053$ $\mu$m) and a Nd:YAG laser ($\lambda=1.357$ $\mu$m) in $LiIO_3$ or $Ag_3AsS_3$.

(4) Effecting a Raman laser from the output of an HF chemical laser (maximum power at $\lambda=2.744$ m) through excitation of the 1552 cm$^{-1}$ vibrational mode in liquid or high-gaseous pressure oxygen.

Effecting a Raman laser from the output of a YLF:$Ho^{3+}$ laser ($\lambda=2.06$ $\mu$m) through excitation of the 2759 cm$^{-1}$ vibrational mode in acetaldehyde.

The excitation power is a critical parameter and must be greater than 1 MW/cm$^2$. Otherwise, there is substantially no conversion from the isocyanide to the nitrile.

The pressure of the isocyanide is also an important parameter. For example, at high pressures (e.g., 10 Torr), total conversion of isocyanide to nitrile occurs in a single laser pulse and at all powers above a certain threshold value. As a consequence, isotopic scrambling will occur due to a chain reaction mechanism. It is desired to operate at a pressure where an enrichment factor of at least about 1.2 is maintained. At an excitation frequency of about 900 to 1100 cm$^{-1}$, a pressure of less than about 2.5 Torr enables obtainment of the requisite enrichment factor.

The yield is defined herein as the amount of nitrile formed from conversion of isocyanide. For example, at a pressure of about 1.5 Torr employing a $CO_2$ TEA laser focused on a sample of methyl isocyanide, a yield of 3.9% is obtained after 5,000 pulses at an energy of 500 mJ/pulse.

The enrichment factor $\beta$ is defined herein as the $^{15}N/^{14}N$ ratio in the product (nitrile) divided by the $^{15}N/^{14}N$ ratio in the reactant (isocyanide). By exciting the C—N stretch band in methyl isocyanide, where the isotope shift is 4.5 cm$^{-1}$, a $\beta$ of 1.3 is achieved at a frequency of 925 cm$^{-1}$. Similarly, excitation of the C—C—N asymmetric stretch band in ethyl isocyanide, where the isotope shift is 3 cm$^{-1}$, at a frequency of 984 cm$^{-1}$, a $\beta$ of 1.2 is achieved.

For comparison, the present technology for nitrogen enrichment is about 1.05. An improvement of the enrichment factor from 1.05 to about 1.3 would reduce the number of theoretical plates or elementary stages to achieve a 99% concentration of $^{15}N$ from about 210 to about 40. A larger isotope shift can further increase the enrichment factor. For example, at the N$\equiv$C streching mode where the isotope shift is about 40 cm$^{-1}$, an enrichment factor of greater than 50 is expected. Here, the number of enrichment stages required would only be 2 or 3. Such improved enrichment factors can substantially eliminate the front end capital investment of conventional enrichment schemes.

The use of excitation of an isocyanide with a $CO_2$ laser, which is focused to induce multiphoton absorption to isomerize the isocyanide by employing vibrational frequencies of the molecule, has considerable advantages over other processes, such as intracavity excitation of an overtone band. In the latter, a C—H stretch is excited which evidences little isotope effect from the presence of nitrogen, and hence isotope enrichment is not very easy.

Apparatus suitable in the practice of the invention comprises (a) a source of monochromatic infrared radiation, such as a $CO_2$ laser, (b) optics for adjusting the radiation beam size and divergence properties, (c) a cell into which the gaseous isocyanide may be introduced and from which the gaseous irradiated gas may be removed and a portion of which is substantially transparent to the beam and (d) means for reflecting the beam several times within the cell. Suitable examples of apparatus are depicted in FIGS. 1 and 2.

Figure 2:
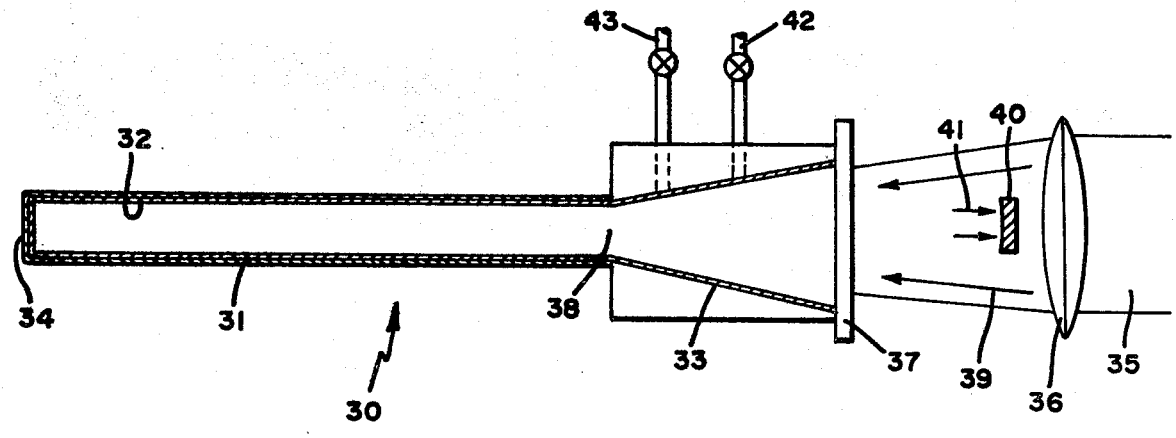
FIG. 2 is a cross-sectional view depicting alternative apparatus useful in the practice of the invention.

The apparatus is FIG. 1 includes a multipass cell, indicated generally at 10, for optimum utilization of photons in the infrared multiphoton-induced isomerization of isocyanides. The cell includes two curved mirrors 12 and 13 mounted on flanges 14 and 15. These mirrors may be planar, spherical, ellipsoidal or any combination thereof, whichever is optimal for coupling the input radiation to the gaseous isocyanide. The flanges are connected in turn to the main body 11 of the cell by vacuum tight, flexible metal bellows 16 and 17, respectively. Micrometers 18 and 19, mounted on the flanges and contacting the main cell body, enable precise orientation and spacing of the mirrors to be achieved, which is allowed by the flexible bellows.

The cell also includes means 20 for introducing isocyanide gas and means 21 for removing irradiated gas, which comprises a mixture of isocyanide and nitrile. The irradiated gas passes to means (not shown) for separating the two compounds, which may comprise, for example, a chromatographic separation column.

The optical system comprises one or more lenses 22, either spheric or aspheric. These lenses adjust the input radiation 23 in size and divergence to the desired characteristics. These characteristics are determined in combination with the selection of the curvature of mirrors 12 and 13 so as to induce maximum absorption of the radiation by the isocyanide while maintaining a high power density pathlength product for the beam throughout most of the cell volume. The adjusted beam 24 is coupled into the cell through a transparent portion 25 of mirror 12. The rest of the mirror is coated for maximum reflecting at the wavelength of the laser being utilized. The entire surface of the second mirror 13 is coated in a similar fashion. By adjusting the angle and separation of the mirrors, the laser beam may be reflected several times, as shown generally at 26, over a significant portion of the cell volume while maintaining a high power density.

The apparatus in FIG. 2 includes a light trapping cell, indicated generally at 30, for use in the separation of isotopes, such as $^{14}N$ and $^{15}N$, via infrared multiphoton isomerization of isocyanides. The apparatus comprises of a long tube 31 either provided with a reflective coating 32 (thickness exaggerated) on its inner surface or a highly polished inner surface for optimum reflectivity at the laser wavelength employed. The tube has a flared opening 33 at one end which is also highly reflecting. The tube is sealed by surface 34 at its other end which also has a highly reflecting inner surface. A laser beam 35 is focused by optical system 36 through a window 37 attached to the flared end of the tube. This optical system may be comprised of one or more lenses, or a raster of square focusing prisms whose foci are coincident with the input of the cylindrical tube at 38. The flaring 33 allows for more efficient coupling of converging radiation 39 into the cylindrical tube. Inside the tube, the laser beam is reflected from the walls, maintaining a high power density and efficient light trapping. A small reflecting mirror 40 may optionally be placed adjacent the focusing optics to reflect back non-absorbed radiation 41 emerging from the cylindrical tube.

Introduction of the isocyanide and removal of the irradiated gas are accomplished by ports 42 and 43, respectively, in the light trapping cell. The irradiated gas, comprising a mixture of isocyanide and nitrile, then passes to physical separation means (not shown), such as a chromatographic column.

The process and apparatus of the invention may also be advantageously employed in separating carbon isotopes, such as $^{12}C$ and $^{13}C$. The stretching modes disclosed herein are due to couplings between carbon and nitrogen atoms. An isotopic change in the carbon atom will result in a similar, although not identical, shift in absorption wavelength, as is manifested by isotopic substitution of the nitrogen atom. Hence, the same stretching modes and approximately the same excitation wavelengths used to separate nitrogen isotopes can be used to separate carbon isotopes.

EXAMPLES

Example 1

To test whether it would be possible to use multiphoton absorption to isomerize methyl isocyanide ($CH_3NC$), several experiments were performed. A $CO_2$ TEA laser was tuned to the P(34) transition of the 10.6 $\mu m$ band (931.00 cm$^{-1}$). This frequency corresponded to a point of significant absorption in the P-branch of the methyl isocyanide C—N stretching mode (945 cm$^{-1}$). The output from the laser was focused into a cell using a 7.5 inch focal length lens. Various pressures of methyl isocyanide were introduced into the cell and illuminated with a focused laser. After a number of pulses, the sample was collected in a small storage vessel for gas chromatograph analysis. The column in the gas chromatograph was packed with Chromosorb 104, which readily separated $CH_3NC$ and $CH_3CN$.

The results of several experiments are listed below.

| $CH_3NC$ Pressure (Torr) | Number of Laser Pulses | Energy Per Pulse (mJ) | $CH_3NC$ Remaining (%) | $CH_3CN$ Formed (%) |
| --- | --- | --- | --- | --- |
| 0.5 | 5,000 | 500 | 99 | 1 |
| 1.5 | 5,000 | 500 | 91 | 4 |
| 5.0 | 5,000 | 500 | 67 | 28 |

While the percentages do not account for the total material, it is believed that the discrepancies are due to a small amount of other products formed.

Example 2

Additional tests were run to determine the effectiveness of the isomerization of methyl isocyanide with the $CO_2$ laser. The same operating conditions as employed in Example 1 were used. The results are tabulated below.

| $CH_3NC$ Pressure (Torr) | Number of Laser Pulses | Energy Per Pulse (mJ) | $CH_3NC$ Remaining (%) | $CH_3CN$ Formed (%) |
| --- | --- | --- | --- | --- |
| 5.0 | 2,000 | 500 | 81 | 16 |
| 10.0 | 2,000 | 500 | 11 | 86 |
| 10.0 | 500 | 500 | 14 | 83 |
| 10.0 | 100 | 500 | 7 | 89 |
| 10.0 | 10 | 500 | 6 | 91 |

From these results and the results in Example 1, some observations are possible. First, the yield per pulse increases with increasing pressure. Further, at the highest pressure investigated (10 Torr), the isomerization is almost total in a very few pulses. At high pressures, collisional effects apparently become important and are manifested in a chain reaction process.

Example 3

To ascertain whether the isomerization of methyl isocyanide was due to thermal effects from the deposited laser energy, an experiment was performed in which the $CH_3NC$ was irradiated with the unfocused output of the TEA laser. Again, the laser was tuned to the P(34) 10.6 $\mu$m transition. Pulse energies of 500 mJ were employed to irradiate a sample of $CH_3NC$ under 10 Torr pressure. Five hundred pulses were employed. Gas chromatography of the irradiated sample showed no isomerization. Apparently, since the high intensities of a focused beam are required, the isomerization process involved absorption of multiple photons.

Example 4

Another set of experiments was performed to determine the threshold for isomerization when the laser was focused with a 7.5 inch lens. In each case, a sample of $CH_3NC$ under 10 Torr pressure was used. Various pulse energies were employed and the samples were analyzed with the gas chromatograph. The results are tabulated below.

| $CH_3NC$ Pressure (Torr) | Number of Laser Pulses | Energy Per Pulse (mJ) | $CH_3NC$ Remaining (%) | $CH_3CN$ Formed (%) |
| --- | --- | --- | --- | --- |
| 10.0 | 500 | 25 | 100 | 0 |
| 10.0 | 500 | 75 | 98 | 1 |
| 10.0 | 500 | 150 | 4 | 95 |

It is clear that a distinct threshold effect is present and occurs near 75 mJ/pulse. A doubling of this energy causes essentially complete isomerization in an equivalent number of laser pulses.

It should be noted that energy/(pulse length $\times$ beam area)=power/$cm^2$. For the particular geometry employed herein, the pulse length was 200 nsec (typical for TEA lasers) and the beam area was about 0.1 $cm^2$. Thus, an energy of 75 mJ/pulse was equivalent to a power of 3 MW/$cm^2$ for the apparatus employed.

Example 5

To determine whether the isomerization of methyl isocyanide was due to dielectric breakdown rather than infrared multiphoton absorption, another test was performed. The $CO_2$ TEA laser was tuned to the P(26), 9.6 $\mu$m transition at 1041.28 $cm^{-1}$. At this wavelength, no detectable absorption exists in the methyl isocyanide infrared spectrum. The output was focused with a 7.5 inch lens into a cell containing $CH_3NC$ under 10 Torr pressure. Two thousand laser pulses at an energy of 500 mJ/pulse were used to irradiate the sample. Subsequent gas chromatographic analysis of the sample indicated no isomerization to acetonitrile. Hence, it may be concluded the isomerization is not a result of dielectric breakdown.

Example 6

The yield of isomer as a function of wavelength was studied. The previous examples have all employed the P(34) line of the 10.6 $\mu$m transition of the $CO_2$ laser. Since the isotope shift is toward longer wavelength, a comparison was made of the yield of isomer at P(40) excitation (924.97 $cm^{-1}$) to that at P(34) (931.00 $cm^{-1}$). The frequency difference between these two laser lines corresponds approximately to the isotope shift in the C—N stretching mode.

| $CH_3NC$ Pressure (Torr) | $CO_2$ Excitation Line | Number of Laser Pulses | Energy Per Pulse (mJ) | $CH_3NC$ Remaining (%) | $CH_3CN$ Formed (%) |
| --- | --- | --- | --- | --- | --- |
| 5.0 | P(34) | 5,000 | 225 | 88 | 11 |
| 5.0 | P(40) | 5,000 | 225 | 94 | 6 |
| 10.0 | P(40) | 100 | 225 | 9 | 91 |

From these results, two observations are noted. First, the yield of isomers at P(40) is approximately half that at P(34), indicating that enrichment is possible (assuming that the yield from $CH_3{}^{14}NC$ and $CH_3{}^{15}NC$ are approximately the same when excited at the same portion of the vibrational band). Second, at elevated pressures, total conversion is still realized in a very few laser pulses, which further demonstrates the necessity of working at lower pressures in any isotope enrichment scheme.

Example 7

To explore further the feasibility of separating nitrogen isotopes by selective isomerization of methyl isocyanide, several other studies were performed. In particular, the wavelength, power and pressure dependence of the yield were investigated. To do this, fixed pressure samples of $CH_3NC$ were irradiated with the TEA $CO_2$ laser tuned to a particular line. Power was then varied for each sample irradiated. Samples were analyzed with a gas chromatograph as before.

In the first study, the laser was tuned to the P(40) line of the 10.6 $\mu$m transition. The output was focused into the sample cell as before. Sample pressures of 2.5 Torr were employed in each test. The results are tabulated below.

| Laser Energy (mJ/pulse) | Number of Laser Pulses | Yield of $CH_3CN$ (%) |
| --- | --- | --- |
| 100 | 5,000 | 0.4 |
| 150 | 5,000 | 1.0 |

| Laser Energy (mJ/pulse) | Number of Laser Pulses | Yield of CH$_3$CN (%) |
|---|---|---|
| 250 | 5,000 | 3.0 |
| 400 | 5,000 | 7.9 |

Figure 3:
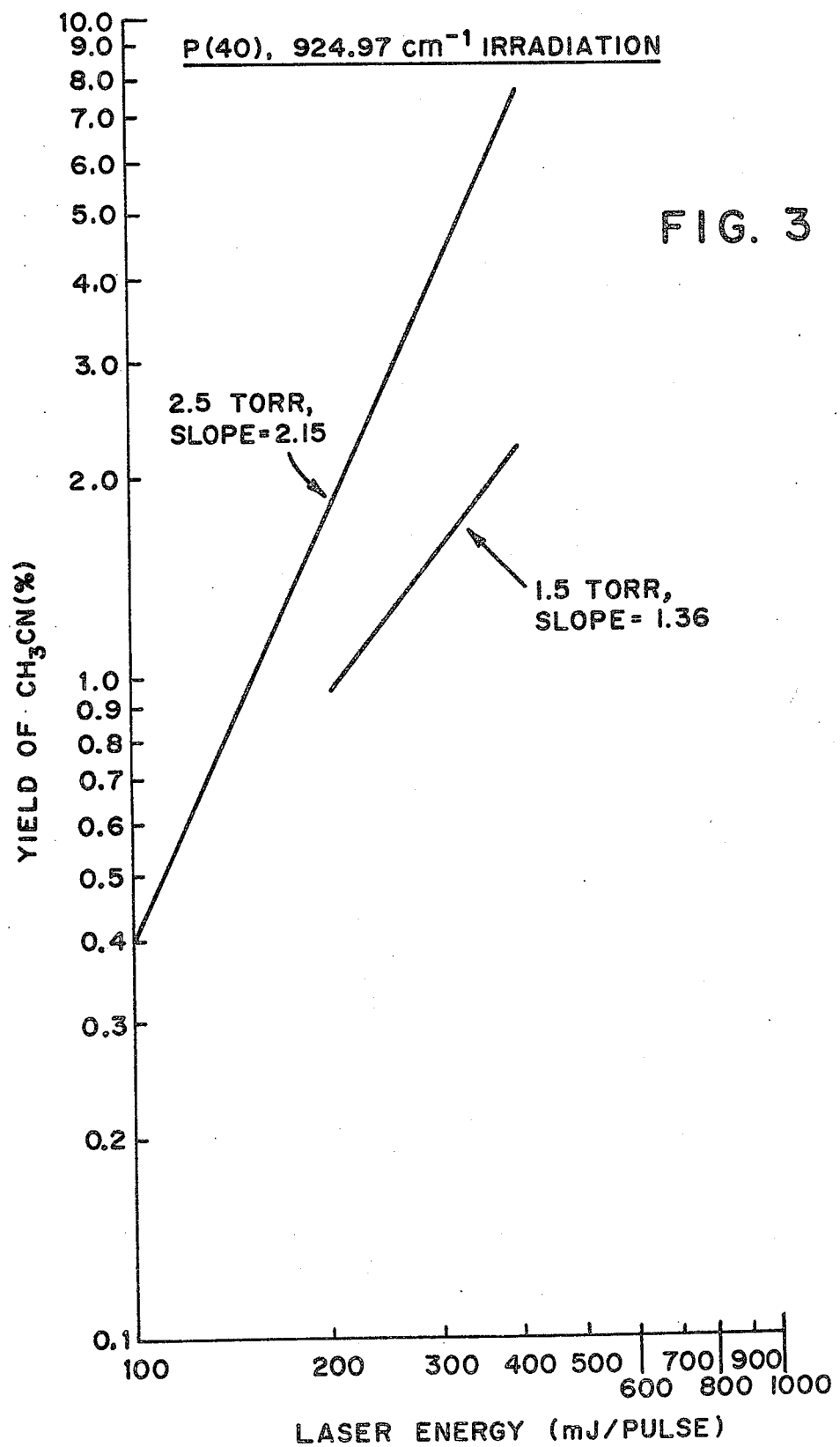
FIG. 3, on coordinates of yield of $CH_3CN$ in percent and laser energy in mJ per pulse, is a plot of the power dependence of conversion of methyl isocyanide to the corresponding nitrile at pressures of 2.5 and 1.5 Torr.

When a log-log plot of yield versus energy was prepared, (FIG. 3), a slope of 2.15 was found for the above data. It is noted that multiphoton processes which do not involve secondary reactions (such as radical chain reactions) typically result in a slope of about 1.5. Since the slope determined here exceeds the expected values, it appears that a chain reaction is involved at the pressure of 2.5 Torr.

Example 8

To determine whether the chain reaction in methyl isocyanide can be suppressed by operating at lower pressures, a series of experiments was run on samples under 1.5 Torr pressure. Again, the laser was tuned to the P(40) line of the 10.6 μm transition and the pulse energy varied for different samples. The results are tabulated below.

| Laser Energy (mJ)/pulse | Number of Laser Pulses | Yield of CH$_3$CN (%) |
|---|---|---|
| 100 | 5,000 | 0 |
| 200 | 5,000 | 1.0 |
| 300 | 5,000 | 1.6 |
| 400 | 5,000 | 2.3 |

When the last three data points (the first was below threshold) were plotted on a log/log graph of yield versus energy (FIG. 3), a slope of 1.36 was obtained. This slope is in reasonably good agreement with a value of 1.5 expected from multiphoton processes. Further, it is indicative of the lessening importance of the chain reaction mechanism when operating at reduced pressure.

Example 9

A sample of CH$_3$$^{15}$NC was synthesized using CH$_3$I and AgC$^{15}$N. Details of the reaction are give in Spectrochimica Acta, 28A, 1375-1391 (1972) and form no part of this invention. Spectra of both the CH$_3$$^{15}$NC and CH$_3$$^{14}$NC were recorded by using a Fourier transform infrared spectrometer. Isotope shifts of 4.5 cm$^{-1}$ and 38 cm$^{-1}$ were found in the C—N stretching mode (945 cm$^{-1}$) and the N C stretching mode (2166 cm$^{-1}$), respectively. An investigation of the yield of isomerization of CH$_3$$^{15}$NC at the 945 cm$^{-1}$ band was attempted. To accomplished this, the CO$_2$ TEA laser was tuned to a point in the P-branch of the 945 cm$^{-1}$ band. A convenient line was chosen to be the P(40) line of the 10.6 m transition.

Samples of CH$_3$$^{14}$NC and CH$_3$$^{15}$NC under 1.5 Torr pressure were irradiated with the laser using a 7.5 inch focal length lens to focus the output from the laser beam in the center of the cell. The laser energy was 400 mJ/pulse, and 10,000 pulses were used to irradiate each sample. The amount of conversion was determined by gas chromatographic analysis. The column used in the gas chromatograph was a 3 ft Chromosorb 104 column. The ratio of CH$_3$C$^{14}$N/CH$_3$$^{14}$NC was found to be 0.0487, while the ratio of CH$_3$C$^{15}$N/CH$_3$$^{15}$NC was 00634. Thus, 30.2% more CH$_3$$^{15}$NC was isomerized than CH$_3$$^{14}$NC. The enrichment factor was 1.3.

Example 10

The same conditions were run as in Example 9, except that 20,000 laser pulses were used in order to obtain higher conversion of CH$_3$NC to CH$_3$CN. In these tests, the ratio of CH$_3$C$^{15}$N/CH$_3$$^{15}$NC was 0.1384, while the ratio of CH$_3$C$^{14}$N/CH$_3$$^{14}$NC was 0.1116, or a conversion of 24.0% more CH$_3$$^{15}$NC over CH$_3$$^{14}$NC. The enrichment factor was 1.24.

From these results, it is clear that $^{15}$N can be enriched from a mixture of CH$_3$$^{15}$NC and CH$_3$$^{14}$NC. Since the isotope effect in the vibrational band being studied was only 4.5 cm$^{-1}$, it would be much more desirable to excite the band at 2166 cm$^{-1}$, where the isotope shift is 38 cm$^{-1}$. The enrichment factor using this latter band is expected to be considerably greater than that obtained from the 945 cm$^{-1}$ band.

Example 11

A mixture of CH$_3$$^{14}$NC and CH$_3$$^{15}$NC was made by combining gaseous samples of each. The mixture was analyzed by mass spectroscopy to obtain the precise isotopic composition. The mixture was found to contain 27.3%±0.2% CH$_3$$^{15}$NC and 72.7±0.2% CH$_3$$^{14}$NC.

Samples of this mixture under 1 Torr pressure were irradiated with the P(40), 10.6 μm transition of the CO$_2$ TEA laser. Twenty thousand laser pulses at an energy of 400 mJ/pulse were used to irradiate the samples. A 7.5 inch lens focused the laser output in the sample cell containing the methyl isocyanide mixture. Following the irradiation, the samples were analyzed by gas chromatography/mass spectroscopy. By measuring the isotopic ratio in the unconverted methyl isocyanide, it was possible to ascertain the preferential conversion of CH$_3$$^{15}$NC to CH$_3$C$^{15}$N. The measured CH$_3$$^{15}$NC content in the unconverted isocyanide was 21.9±0.5%. This result corresponds to an enrichment factor of 1.34±0.05 and proves conclusively the viability of isotope enrichment via the isomerization of isocyanides.

Example 12

Isomerization of ethyl isocyanide (C$_2$H$_5$NC) to proprionitrile (C$_2$H$_5$CN) was studied by subjecting a sample under 2 Torr pressure to a CO$_2$ TEA laser. The C—C—N asymmetric streching frequency, $\nu_9$, at 1021 cm$^{-1}$ was excited by the P(44), 1023.19 cm$^{-1}$ line of the laser. The sample was irradiated with 5000 pulses at 250 mJ/pulse. Gas chromatography indicated that the amount of isocyanide remaining was 52%, and the amount of nitrile formed was 44%.

Example 13

Four samples of C$_2$H$_5$NC, each under 2 Torr pressure, were irradiated with the P(42), 1025.30 cm$^{-1}$ line from the CO$_2$ laser. The samples were irradiated with 5000 pulses. The results (gas chromatographic analysis) were as follows:

| Sample | Laser Energy (mJ/pulse) | Yield of C$_2$H$_5$CN(%) |
|---|---|---|
| 1 | 76.6 | 18 |
| 2 | 140 | 28 |
| 3 | 268 | 50 |
| 4 | 367 | 57 |

Figure 4:
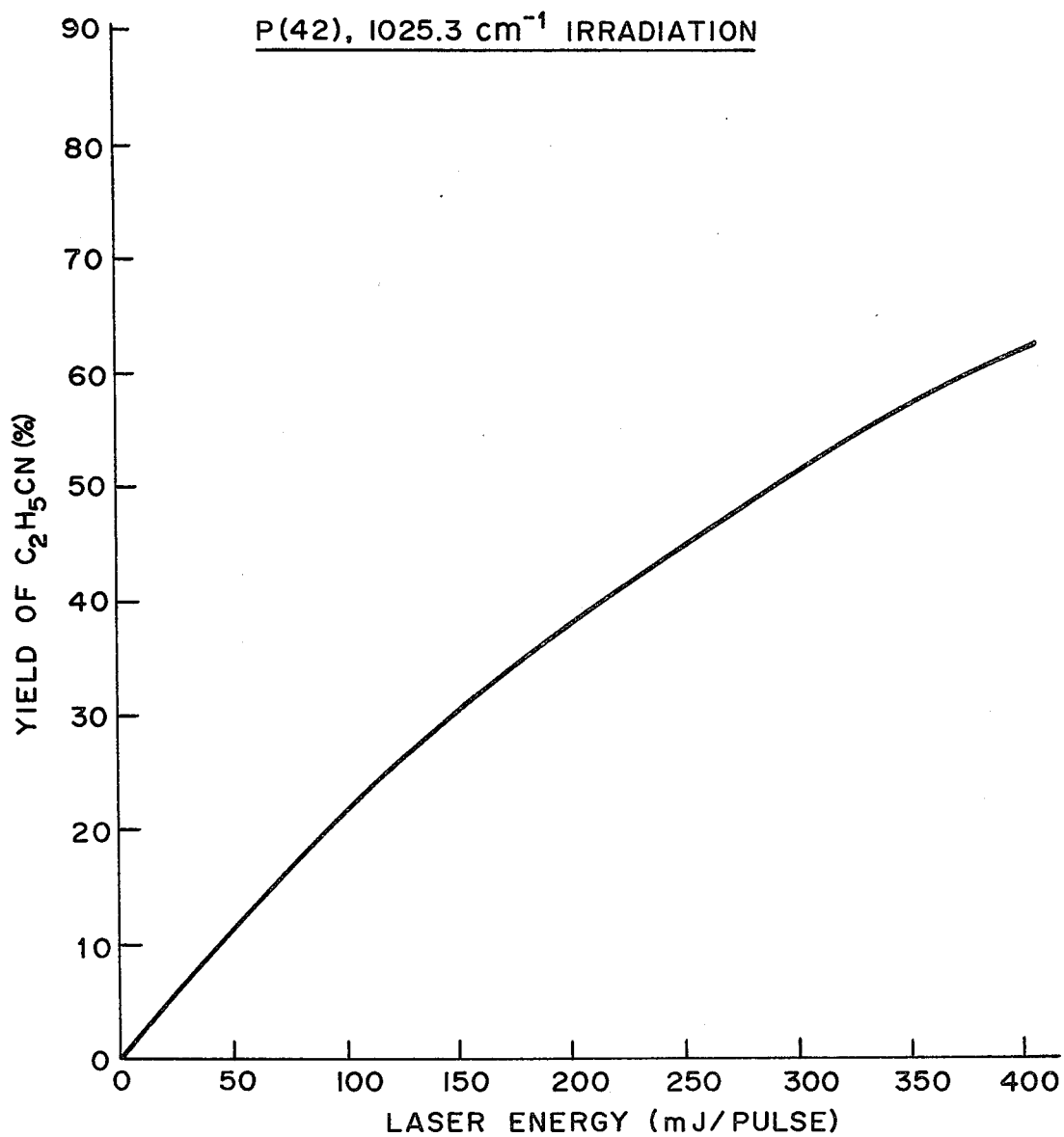
FIG. 4, on coordinates of yield of $C_2H_5CN$ in percent and laser energy in mJ per pulse, is a plot of the power dependence of conversion of ethyl isocyanide to the corresponding nitrile at a pressure of 2 Torr.

A plot of these data is shown in FIG. 4.

Example 14

A sample of $C_2H_5{}^{15}NC$ was synthesized from $C_2H_5I$ and $AgC^{15}N$, as in Example 9. Spectra of both the $C_2H_5{}^{15}NC$ and $C_2H_5{}^{14}NC$ was recorded. Isotope shifts of 3 cm$^{-1}$ were observed for the $\nu_9$ and $\nu_5$ C—C—N stretching modes (1021 and 842 cm$^{-1}$, respectively) and an isotope shift of 41 cm$^{-1}$ was observed for the N≡C stretching mode (2151 cm$^{-1}$). These shifts are comparable to those observed for $CH_3NC$.

Several samples of $C_2H_5{}^{15}NC$ and $C_2H_5{}^{14}NC$ were irradiated with the R(34), 984 cm$^{-1}$ emission line from a $CO_2$ TEA laser. Sample pressures were all 1 Torr. The samples were irradiated with 2500 laser pulses, at 400 mJ/pulse energy. The amount of conversion was determined by gas chromatographic analysis. The ratio of $C_2H_5C^{14}N/C_2H_5{}^{14}NC$ was found to be 0.0572, while the ratio of $C_2H_5C^{15}N/C_2H_5{}^{15}NC$ was 0.0681. Thus, 19.1% more $C_2H_5{}^{15}NC$ was isomerized than $C_2H_5{}^{14}NC$. The enrichment factor was 1.19.

For the reasons stated in Example 10, the enrichment of $C_2H_5C^{15}N$ could be increased considerably by exciting the 2151 cm$^{-1}$ band.

What is claimed is:

1. A process for obtaining nitrile compounds which are enriched in a particular first elemental isotope which comprises exposing a gaseous organic isocyanide containing said first isotope and one or more other isotopes of the same element to infrared radiation of a predetermined wave length from a laser-based device which selectively isomerizes said isocyanide containing said first isotope to the corresponding nitrile without substantially isomerizing said isocyanide containing other isotopes of said element.

2. The process of claim 1 wherein said first elemental isotope is any of the isotopes of nitrogen.

3. The process of claim 1 wherein said first elemental isotope is any of the isotopes of carbon.

4. The process of claim 1 wherein said isocyanide compound is an alkyl isocyanide.

5. The process of claim 4 wherein said alkyl isocyanide is selected from the group consisting of methyl isocyanide and ethyl isocyanide.

6. The process of claim 1 wherein said infrared radiation is obtained from a $CO_2$ or CO laser.

7. The process of claim 1 wherein said infrared radiation is obtained by second harmonic generation of the output of a $CO_2$ laser.

8. The process of claim 1 wherein said infrared radiation is obtained by difference frequency generation by mixing the outputs of $Nd^{3+}$-based lasers in a non-linear optic crystal.

9. The process of claim 1 wherein said infrared radiation is obtained by stimulated Raman scattering.

10. The process of claim 1 wherein said gaseous organic isocyanide is passed through a cell and is exposed to a multiple-reflected beam of infrared radiation.

* * * * *